US010274679B2

(12) United States Patent
Jensen et al.

(10) Patent No.: US 10,274,679 B2
(45) Date of Patent: Apr. 30, 2019

(54) FIELD ACCESS TERMINAL SYSTEM

(71) Applicant: CORNING OPTICAL COMMUNICATIONS LLC, Hickory, NC (US)

(72) Inventors: Joseph Clinton Jensen, Lawndale, NC (US); Kenneth Darrell Temple, Jr., Newton, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/827,914

(22) Filed: Nov. 30, 2017

(65) Prior Publication Data

US 2018/0088278 A1 Mar. 29, 2018

Related U.S. Application Data

(63) Continuation of application No. PCT/US2016/035667, filed on Jun. 3, 2016.
(Continued)

(51) Int. Cl.
*G02B 6/24* (2006.01)
*G02B 6/44* (2006.01)
(Continued)

(52) U.S. Cl.
CPC ............ *G02B 6/241* (2013.01); *G02B 6/245* (2013.01); *G02B 6/25* (2013.01); *G02B 6/4475* (2013.01); *G02B 6/4212* (2013.01); *G02B 6/445* (2013.01)

(58) Field of Classification Search
CPC ...... G02B 6/38; G02B 6/3806; G02B 6/3826; G02B 6/3836; G02B 6/3839; G02B 6/3855; G02B 6/3858; G02B 6/3863; G02B 6/3869; G02B 6/3875; G02B 6/3885; G02B 6/3887; G02B 6/3893; G02B 6/241;
(Continued)

(56) References Cited

U.S. PATENT DOCUMENTS 4,842,361 A 6/1989 Schrauder
5,371,827 A * 12/1994 Szegda ................ G02B 6/3887
385/136
(Continued)

OTHER PUBLICATIONS

International Search Report and Written Opinion of the International Searching Authority dated Aug. 31, 2016; PCT/US2016/035667; 11 Pages; ISA/US Commissioner for Patents.
EP16804499.8 Search Report dated Jan. 14, 2019, European Patent Office, 11 Pgs.

*Primary Examiner* — Michael Mooney
(74) *Attorney, Agent, or Firm* — William D. Doyle (57) ABSTRACT

An optical communication cable and related systems and methods are provided. A method for field terminating an optical fiber of a fiber optic distribution cable includes accessing at least one of a plurality of optical fibers of the distribution cable by creating an access location in the distribution cable, inserting a cutting tool through the access location such that the cutting tool extends longitudinally past the access location a predetermined distance, terminating the at least one of the plurality of optical fibers at the predetermined distance, removing at least a portion of the at least one terminated optical fiber through the access location, and inserting the portion of the at least one terminated optical fiber through a furcation tube premounted on a small access closure device.

20 Claims, 6 Drawing Sheets

Related U.S. Application Data (60) Provisional application No. 62/261,019, filed on Nov. 30, 2015, provisional application No. 62/171,596, filed on Jun. 5, 2015.

(51) Int. Cl.
  *G02B 6/25* (2006.01)
  *G02B 6/245* (2006.01)
  *G02B 6/42* (2006.01)

(58) Field of Classification Search
  CPC ........ G02B 6/245; G02B 6/25; G02B 6/4212; G02B 6/4401; G02B 6/4403; G02B 6/4405; G02B 6/445; G02B 6/4475; G02B 6/4479; G02B 6/4486
  USPC .............................................. 385/53–87, 114
  See application file for complete search history.

(56) References Cited

U.S. PATENT DOCUMENTS

| | | | |
|---|---|---|---|
| 5,460,682 A | 10/1995 | Beasley et al. | |
| 7,817,891 B2 | 10/2010 | Lavenne et al. | |
| 7,941,021 B2 | 5/2011 | Cody et al. | |
| 8,414,196 B2 | 4/2013 | Lu et al. | |
| 2005/0111800 A1 | 5/2005 | Cooke et al. | |
| 2007/0263965 A1 | 11/2007 | Cody et al. | |
| 2010/0158453 A1* | 6/2010 | Cody .................. | G02B 6/4433 385/100 |
| 2011/0243514 A1* | 10/2011 | Nave .................. | G02B 6/4459 385/110 |
| 2013/0094828 A1* | 4/2013 | Loeffelholz .......... | G02B 6/4453 385/135 |

\* cited by examiner

FIELD ACCESS TERMINAL SYSTEM

CROSS-REFERENCE TO RELATED APPLICATIONS

This application is a continuation of International Application No. PCT/US16/35667, filed on Jun. 3, 2016, which claims the benefit of priority to U.S. Application No. 62/171,596, filed on Jun. 5, 2015, and U.S. Application No. 62/261,019, filed on Nov. 30, 2015, each of which is incorporated herein by reference.

BACKGROUND

The disclosure relates generally to optical communication cables and related hardware, and in particular to fiber optic cables, hardware, and network solutions involving mid-span access of fibers. Optical communication cables have seen increased use in a wide variety of electronics and telecommunications fields. Optical communication cables may contain or surround one or more optical communication fibers. The cable provides structure and protection for the optical fibers within the cable. As buried Fiber-to-the-Home (FTTH) installations become more prevalent, a low cost, efficient Network Access Point for 1 or 2 users is needed in order to contain deployment connectivity costs, particularly in rural applications.

SUMMARY

Access to the fibers at mid-span locations is provided via cables, hardware, and methods that reduce the size of the access openings and the related closure hardware.

In accordance with aspects of the present disclosure, a cable and hardware solution allows for very low cost civil works at the point of customer connectivity. Legacy solutions for this space rely upon traditional mid-span sheath Fiber Optic splice closures that require relatively large openings in the cable sheath in order to gain sufficient fiber length for splicing or connectorizing 1F distribution fibers. The cables, hardware and solutions of the present application significantly reduce the distance of the sheath opening which allows for a much smaller hardware, for example small access closures that are field accessible and beneficial in certain applications, such as a buried installation solution. The smaller hardware in turn allows for smaller civil infrastructure, wherein the size reduction of the terminal allows cable installers to place smaller handholes or pedestals much faster than previously allowed which saves labor and material costs. Other solutions that solve the space problem exist but require pre-engineering of the distribution cables because the access points are pre-placed on the cables from the manufacturer. The cables, hardware and methods of the present disclosure provide similar value but can be executed in the field by the installation technician.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
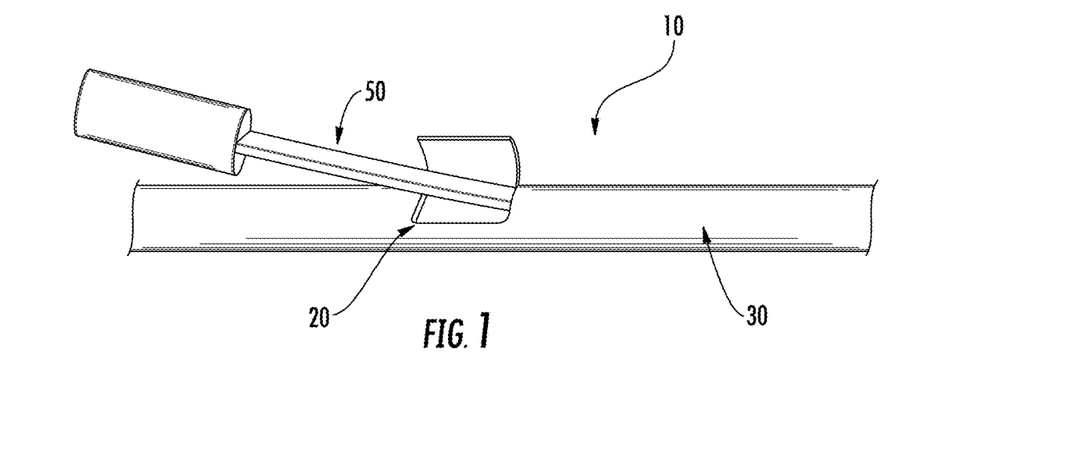
FIG. 1 is a perspective view of an optical communication cable and fiber cutting tool, in accordance with aspects of the present disclosure.
Figure 2:
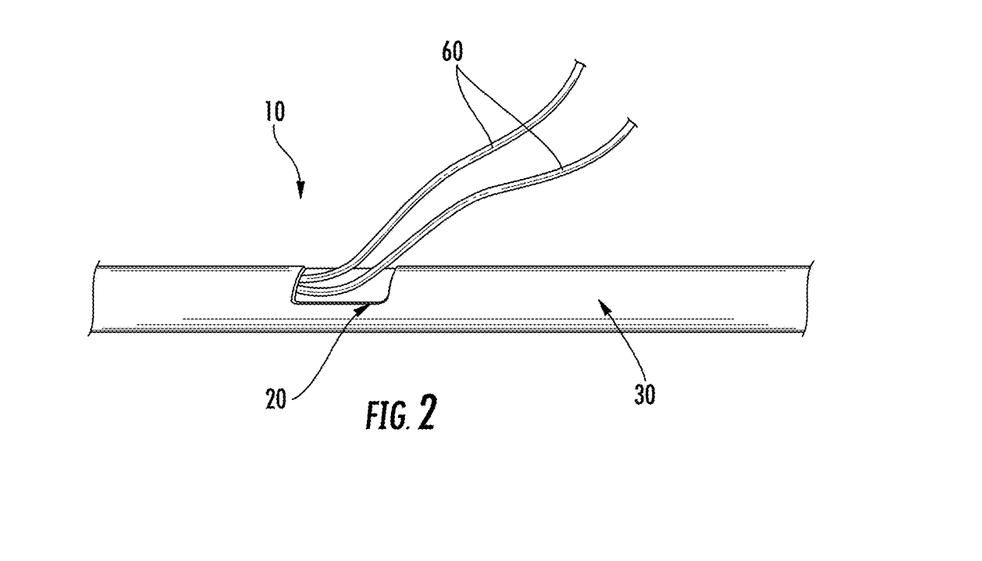
FIG. 2 is a perspective view of an optical communication cable and fibers extracted at a mid-span location, in accordance with aspects of the present disclosure.

Referring to FIG. 1, a fiber optic cable 10 may allow for quick and easy mid-span access of fibers internal to the cable sheath through a small opening 20. The fiber optic cable 10 may include loose or ribbonized fibers floating in a centralized tube cable sheath 30. The open area inside the cable sheath 30 may be oversized to allow for the free floating of the fibers but also allow for the insertion of a tool 50 internal to the cable, the tool designed for cutting the fibers inside the sheath 30 some distance from the mid-span opening 20 of the sheath. After cutting the desired number of fibers, for example one or two, the cut fibers 60 may then be extracted through the small cable sheath opening 20, as shown in FIG. 2.

Figure 3:
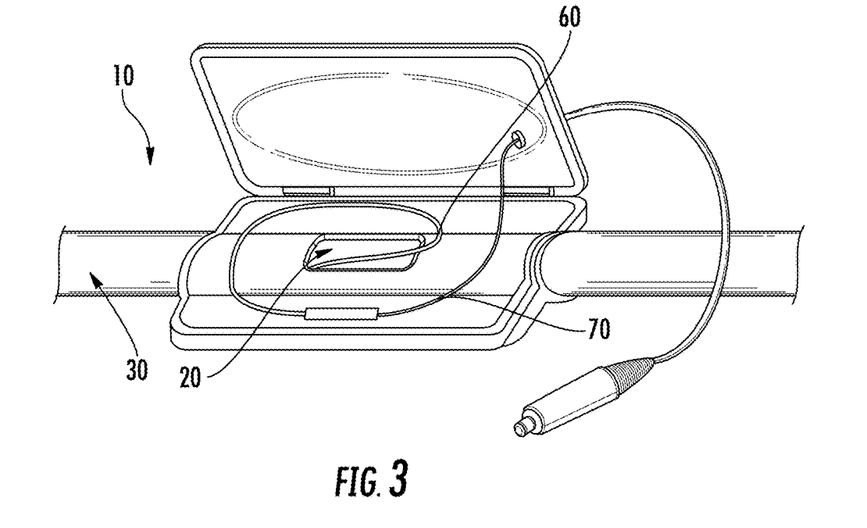
FIG. 3 is a perspective view of an optical communication cable and related hardware at a mid-span location of the cable, in accordance with aspects of the present disclosure.
Figure 4:
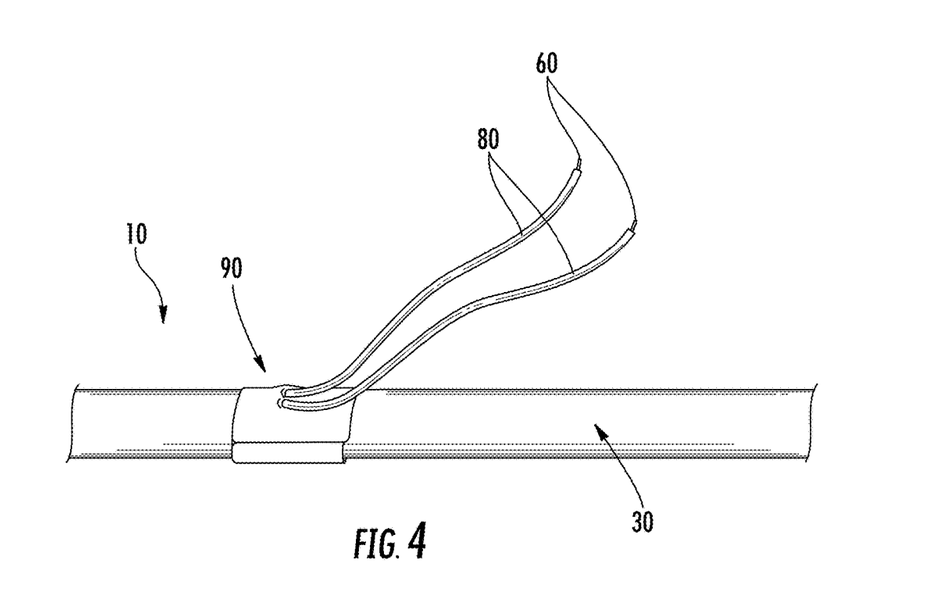
FIG. 4 a perspective view of an optical communication cable and related hardware at a mid-span location of the cable, in accordance with aspects of the present disclosure.

A number of methods may then be employed by a field technician, for example, to provide connectivity of the cut fibers 20 to a service subscriber location. For example, the technician may take the cut fibers 60 and splice them to the preconnectorized hardened or non-hardened pigtail fibers 70, as shown in FIG. 3. In accordance with yet another aspect of the present disclosure, the technician may terminate the cut fibers 60 onto field installable connectors (not shown). These connectors would then be ready to accept pre-connectorized drop cables for routing to the service subscriber. In accordance with yet another aspect of the present disclosure, the technician may take the cut fibers 60 and insert them into furcation tubes 80 that are pre-mounted into a very small mid-span access closure 90. The furcation tubes 80 may then be routed to an above grade area to better facilitate splicing or field termination with field installable connectors.

Figure 5:
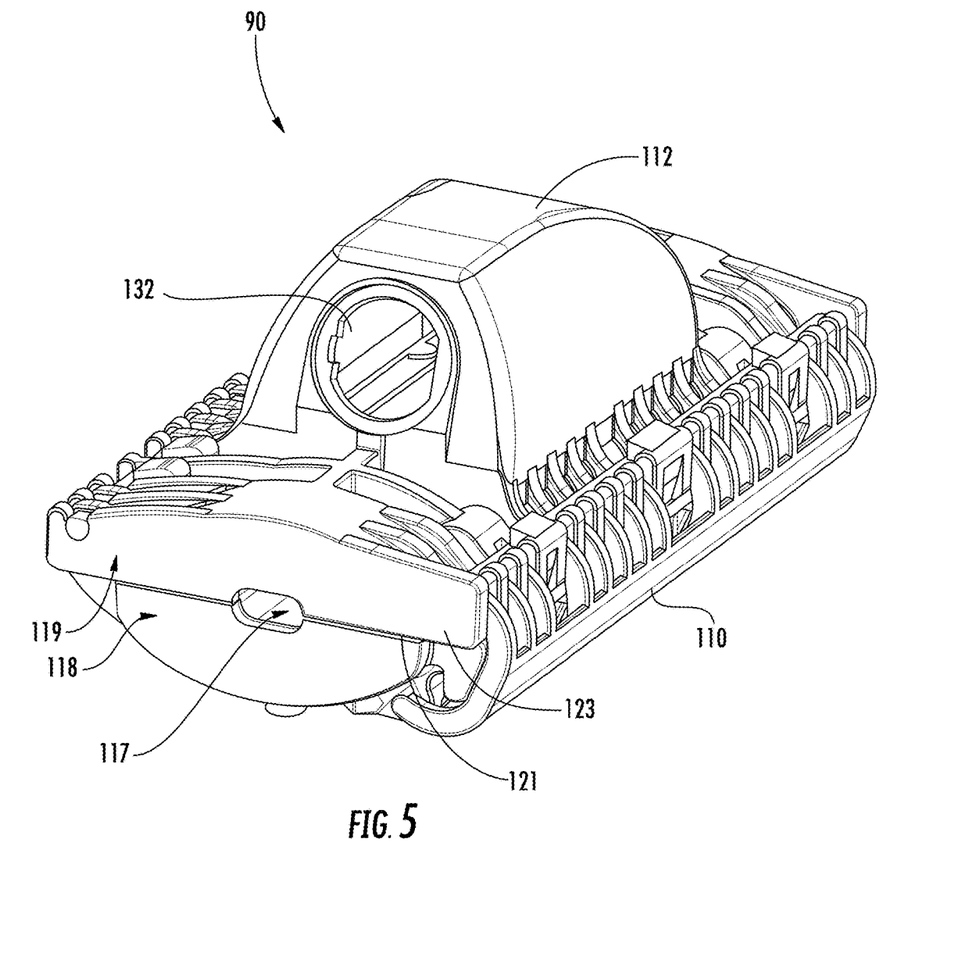
FIG. 5 is a perspective view of a mid-span closure device, in accordance with aspects of the present disclosure.

In accordance with aspects of the present disclosure, FIG. 5 illustrates a mid-span access closure 90 that may include a base 110 and cover 112. The base 110 and cover 112 may be injection molded and made of a hard plastic. The base 110 and cover 112 cooperate to form a waterproof or airtight seal around the mid-span access hole 20. The cover 112 may be pivotally attached to the base 110 to open and close in a clamshell fashion, and/or the cover 112 may close with the base 110 via compression fit or snap-fit features, for example, to define an interior region 134 of the closure 90.

Cable insertion regions 117 may be formed on mutually opposite sides 15 of the in-line closure 90 or one of the cover 112 or the base 110, with it being possible for cables to be inserted into the interior 134 of the inline cable closure 90 or passed out of the interior. In the exemplary embodiment shown, in each case two cable insertion regions 17 for inserting in each case one cable into the interior 14 of the inline cable closure 10 are formed on both mutually opposite sides 115 of the closure.

In the shown embodiment, the base 110 and cover 112 are hinged together at first sides 118, 119 of the same. In the example embodiment the first sides 118, 119 are longitudinal sides of the clam-shells 110, 112. The base 110 and cover 112 can be pivoted with respect to each other around a hinge 128 by which the base 110 and cover 112 are fixed to each other at the first longitudinal sides 118, 119 of the same.

Figure 6:
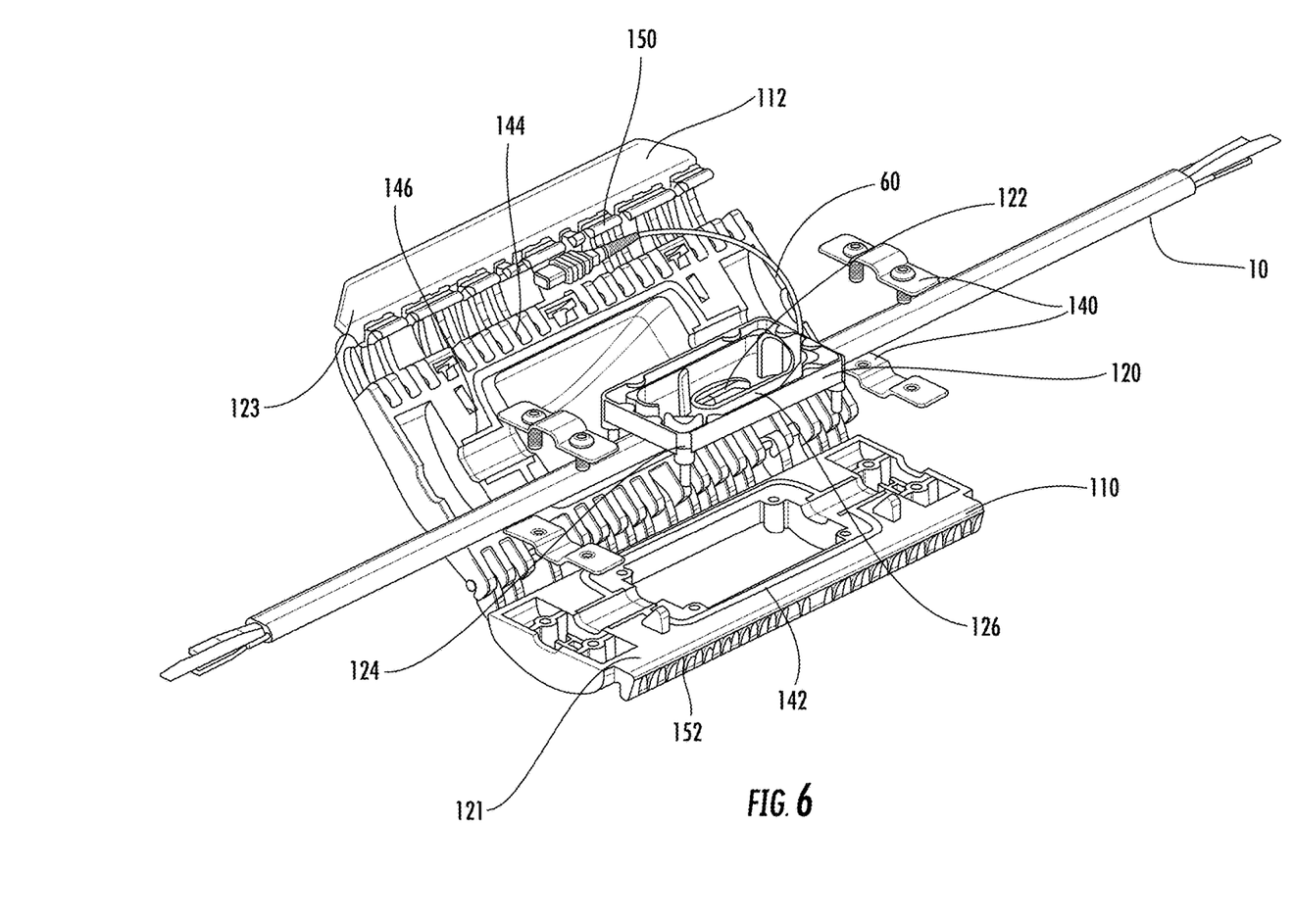
FIG. 6 is a perspective view of the mid-span closure device of FIG. 5 in accordance with aspects of the present disclosure.

As shown in FIGS. 5 and 6, for example, when the cable closure 90 is closed, second sides 121, 123 of the base 110 and cover 112 can be locked to each other by a closing mechanism.

As shown in FIG. 6, the closure 90 may have a plate 120 that is removably connected to the base 110. The plate 120 may have a fenestration 122 that can be substantially aligned with the opening 20 in the cable 10 such that the cut fiber(s) 60 are routed through the fenestration 122. Alignment pins 124 may be used to align and/or couple the plate 120 to the base 110 once the cut fiber 60 is accessed and routed through the fenestration 122. In this regard, the plate 120 may also have fiber storage features 126, such as channels or empty space to hold or contain excess cut fiber 60 and/or a fenestration tube associated with the cut fiber 60.

Figure 7:
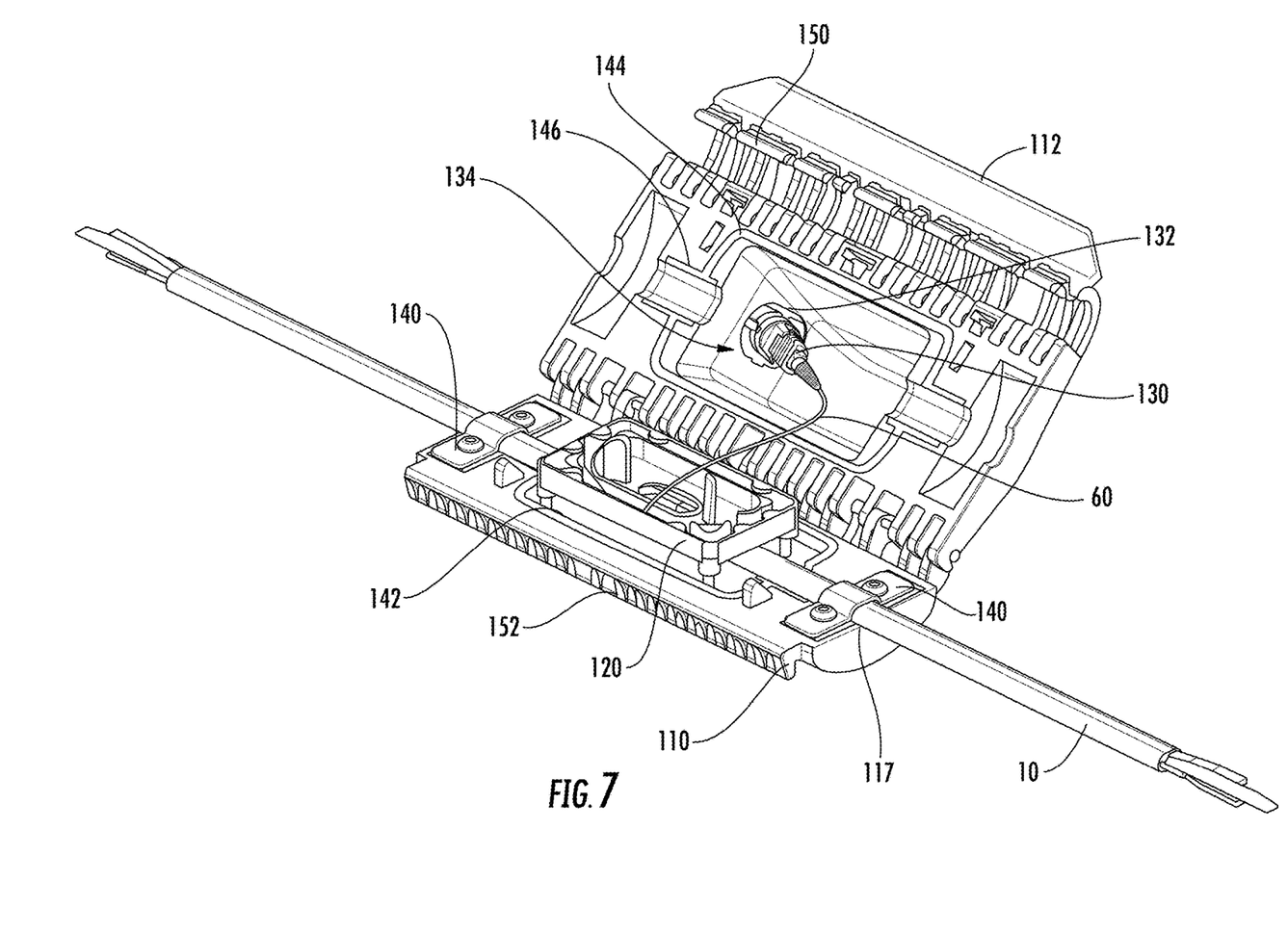
FIG. 7 is a close-up perspective view of the mid-span closure device of FIG. 5 in accordance with aspects of the present disclosure.

As shown in FIG. 7, a connector 130 may be spliced onto the end of the cut fiber 60. The cover 112 is formed with a mounting port 132 that communicates from an interior cavity 134 formed in the cover 112 through the cover to an external area. In this manner the connector 130 may be sealably mounted into the mounting port 132 to provide connectivity without having to access the inside of the closure 90. As also shown in FIG. 7, the plate 120 may be coupled to the base 110 and clamps 140 used to fixedly couple the closure 90 to the cable 10. Sealing element 142 in the base 110 may cooperate with sealing elements 144, 146 in the cover 112 and the mounting port 132, respectively, to provide a waterproof, airtight seal when the closure 90 is closed and the locking detests 150 on the cover 112 engage with the locking bar 152 on the base 110. The compressible and/or deformable sealing elements 142, 144, and 146 may be gel-like sealing elements, for example polyurethane gels or silicone gels. Such gel-like sealing elements are deformable and can be compressible.

Figure 8:
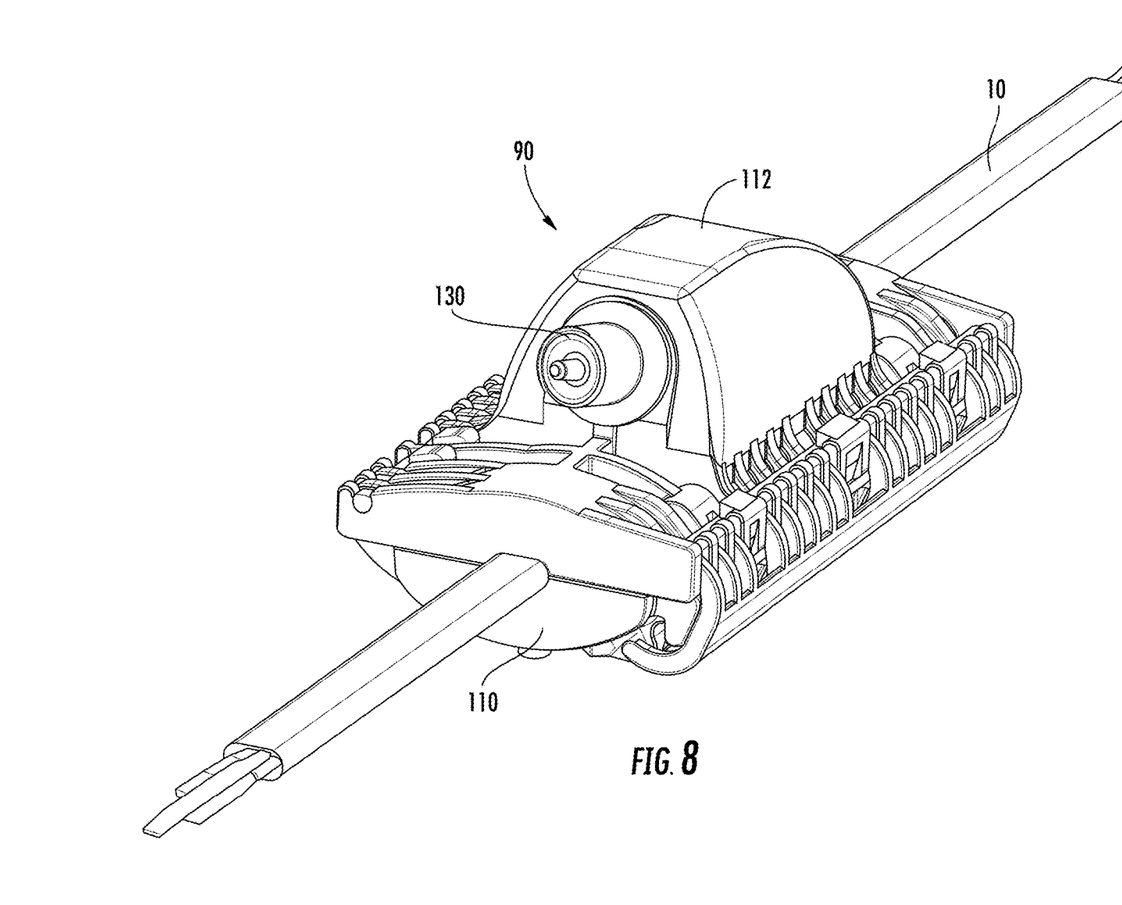
FIG. 8 is a perspective view of a cable assembly including the mid-span closure device of FIG. 5 and an optical communication cable.

As shown in FIG. 8, the base 110 and cover 112 of the closure 90 may tightly seal around the opening 20 made in the cable 10 while providing access to the connector 130 once the mid-span access procedure is complete.

A system employing the cables, hardware and methods described herein thus allows for very small field access closures, which in turn allows for very small handholes or pedestals. Handhole sizes may be reduced 75% or more in size while still allowing for the same or better accessibility to subscriber connection ports.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred, in addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method for field terminating an optical fiber of a fiber optic distribution cable:
   accessing at least one of a plurality of optical fibers of the distribution cable by creating an access location in the distribution cable;
   inserting a cutting tool through the access location such that the cutting tool extends longitudinally past the access location a predetermined distance;
   cutting the at least one of the plurality of optical fibers at the predetermined distance;
   removing at least a portion of the at least one cut optical fiber through the access location;
   inserting the portion of the at least one cut optical fiber through a furcation tube configured to cooperate with a small access closure device, including a base and a cover, for enclosing the access location.

2. The method of claim 1, wherein the base and the cover cooperatively seal around the access location.

3. The method of claim 1, further comprising:
   connectorizing the terminated optical fiber.

4. The method of claim 2, wherein the cover includes a connector port configured to provide communication through the cover between an interior portion and an exterior portion of the closure device.

5. The method of claim 4, further comprising locking the cover and base to seal the interior portion from exposure to the exterior portion of the closure device.

6. A closure device for a mid-span access location on an optical communication cable, the closure device comprising:
   a base portion;
   a cover portion that couples with the base portion to define an interior portion of the closure device; and
   a plate removably connected to either the base portion or the cover portion, the plate having a fenestration for routing a cut fiber of the communication cable through the access location into an interior of the closure device.

7. The closure device of claim 6, wherein the cover portion further comprises a mounting port to provide communication from the interior of the closure device to an exterior of the closure device.

8. The closure device of claim 6, further comprising sealing features to seal the interior from the exterior of the closure device when the cover portion is engaged with the base portion.

9. The closure device of claim 8, further comprising locking detents on one of the cover portion or the base portion and a locking bar on the other one of the cover portion or the base portion for coupling the cover portion and the base portion in a closed position.

10. The closure device of claim 6, further comprising removable clamps for coupling the closure device to an optical communication cable.

11. A cable assembly comprising:
an optical distribution cable comprising an access location for accessing an optical fiber within the distribution cable;
a closure device for sealing closed the access location, the closure device comprising:
a base portion;
a cover portion that cooperates with the base portion to define an interior portion of the closure device: and
a plate removably connected to either the base portion or the cover portion, the plate having a fenestration for routing a cut fiber of the communication cable through the access location into the interior portion of the closure device; and
a preterminated optical fiber extending from an interior of the distribution cable to the interior portion of the closure device.

12. The closure assembly of claim 11, wherein the cover portion comprises a connector mounting port.

13. The closure assembly of claim 12, further comprising sealing features to seal the interior portion of the closure device from the exterior of the closure device when the cover portion engages the base portion.

14. The closure assembly of claim 11, further comprising locking detents on one of the cover portion or the base portion and a locking bar on the other one of the cover portion or the base portion for coupling the cover portion and the base portion into a closed position.

15. The closure assembly of claim 11, further comprising removable clamps for coupling the closure device to the optical distribution cable.

16. The closure assembly of claim 15, further comprising cable insertion regions on opposing sides of the closure device, the cable insertion regions being aligned with a longitudinal axis of the distribution cable and the removable clamps.

17. The closure assembly of claim 13, wherein the sealing features are gel-like sealing elements that are deformable and compressible.

18. The closure assembly of claim 11, further comprising a field installable connector is connected to the preterminated optical fiber.

19. The closure assembly of claim 18, wherein the field installable connector is sized to sealably mount into the mounting port of the cover portion.

20. The closure assembly of claim 11, wherein the preterminated optical fiber is a portion of an optical ribbon.

* * * * *